Dec. 23, 1969  P. D. EVANS  3,485,041
CRANKING SYSTEM FOR A GAS TURBINE
Filed Dec. 7, 1967  2 Sheets-Sheet 1
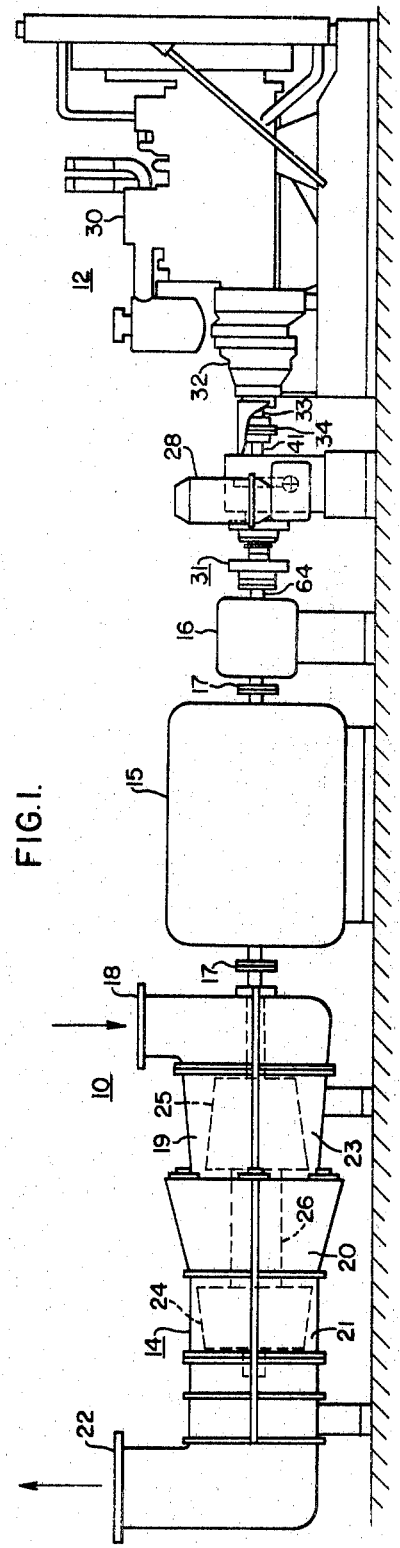
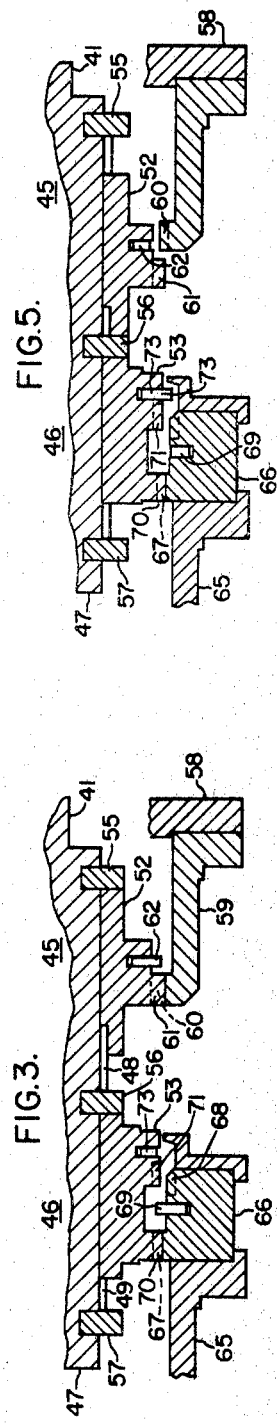
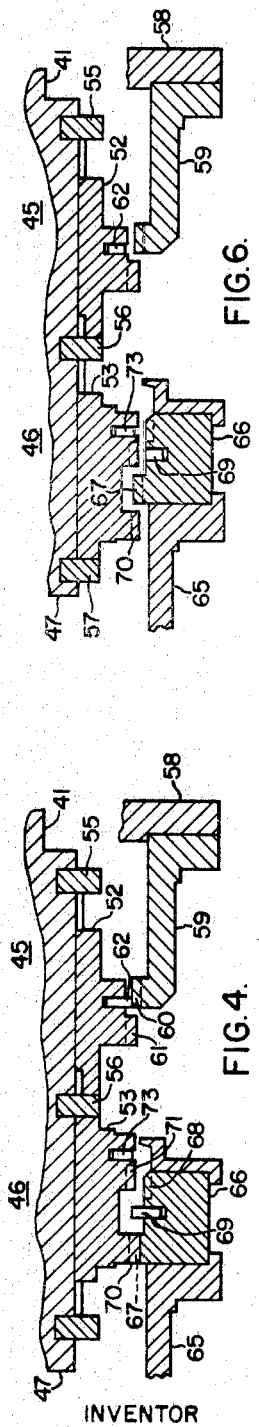
INVENTOR
Palmer D. Evans
BY United States Patent Office 3,485,041
Patented Dec. 23, 1969

3,485,041
CRANKING SYSTEM FOR A GAS TURBINE
Palmer D. Evans, Newtown Square, Pa., assignor to Westinghouse Electric Corporation, Pittsburgh, Pa., a corporation of Pennsylvania
Filed Dec. 7, 1967, Ser. No. 688,949
Int. Cl. F02c 7/26
U.S. Cl. 60—39.14                    10 Claims

ABSTRACT OF THE DISCLOSURE

This invention provides a coaxially aligned system for cranking a gas turbine from a state-of-rest to a self-sustaining speed by employing a very slow speed high torque motor or prime mover (for example about 3–15 r.p.m.) to overcome the static friction and initiate rotation of the turbine rotor, and a second motor or prime mover having a torque converter and having a speed range extending to at least as high as the self-sustaining speed of the turbine (for example 1,000–3,000 r.p.m.), to accelerate rotation of the turbine rotor to the high speed required for the turbine to run under its own power.

The two motors or prime movers have coaxial output shafts connected to torque responsive positive coupling mechanisms which, in accordance with the invention, are arranged in such a manner that the driving effort is shifted from the low speed motor or prime mover to the high speed motor or prime mover after slow speed rotation is initiated. The low speed motor output shaft is interposed between the high speed motor output shaft and the turbine rotor and the output shaft of the high speed motor is drivingly connected to the high speed motor by a fluid type torque converter.

BACKGROUND OF THE INVENTION

Gas turbine power plants, like reciprocating internal combustion engines, require an external source of cranking power for starting, but unlike reciprocating internal combustion engines must be cranked to a relatively high speed (on the order of about 45% of normal speed) before they become self-sustaining, i.e. run under their own power. When a single starting motor is employed, the motor becomes very costly since the locked rotor output torque rating of such a motor must necessarily be very high to accommodate the high breakaway torque of the turbine rotor while, at the same time, it must also be capable of delivering moderate output torque at high speed. In view of this, two motors (or prime movers) are usually employed for cranking; a very slow speed, high torque motor, or a higher speed, lower output torque motor having a large speed reduction ratio, for providing the high breakaway torque required to overcome the static friction and inertia of the turbine rotor and to start it turning, and a motor having a running speed range at least as high as the self-sustaining speed of the turbine to accelerate the rotor speed to a speed at which fuel combustion in the turbine may be initiated to form the hot products of combustion required to motivate the turbine, so that it will run under its own power.

Even when two motors are employed, the power rating of the higher speed motor is quite substantial and, when employed with industrial gas turbines of large horsepower output (i.e. about 15,000 H.P. and above), the power rating of the higher speed motor may be on the order of about 500 H.P. and above.

When a diesel engine (or any other type of internal combustion engine) is employed as the higher speed motor or prime mover, the engine speed must be well above its minimum idle speed, i.e. 1,800–2,100 r.p.m., in order to develop the torque required to accelerate the turbine from near rest, i.e. less than 15 r.p.m., to self-sustaining speed. It is therefore necessary to incorporate a slip type coupling, such as a hydraulic (or pneumatic) torque converter, between the diesel engine and the turbine rotor.

Interposition of the hydraulic torque converter between the diesel engine and the gas turbine renders ineffective any attempt to transmit the turning effort of the slow speed or turning gear motor through the diesel engine, as has been done when a steam turbine or an electric motor have been used to crank the gas turbine from slow (turning gear) speed to self-sustaining speed, since the low turning gear motor speed is insufficient to overcome the inherent slippage in the torque converter.

A prior scheme, utilized with a high degree of success is disclosed in P. D. Evans Patent 2,962,597, issued Nov. 29, 1960, and assigned to the same assignee as this invention. In this scheme, the higher speed motor is an electric motor which, as well known in the art, has a high starting torque and requires no torque converter. Accordingly, the turning gear motor is arranged to drive the turbine rotor through the electric motor and is declutched after slow speed rotation. This arrangement, as explained above, is of course not feasible with an internal combustion engine.

SUMMARY

Briefly, the invention provides a novel system for cranking a gas turbine from a state-of-rest to a self-sustaining speed, which system employs a first motor having a slow speed output gear and providing a high breakaway torque and sustained slow speed, and a second or high speed motor having an output shaft rotatable in a speed range extending from a slow speed to a speed at least as high as the self-sustaining speed of the gas turbine and having a low starting torque.

The invention is primarily concerned with an inline arrangement of the gas turbine rotor and the slow and high speed motor output shafts; thereby eliminating transverse thrust and other problems associated with belts and pulleys or gears required in a side-by-side arrangement of the motors and turbine rotor.

Since the high speed motor has a low starting torque and is preferably of the internal combustion type, the output shaft of this motor is provided with a torque converter to provide a degree of slippage in the low output speed range.

The slow speed motor output gear is connected to an outer shaft interposed between the turbine rotor and the torque converter of the high speed motor and the torque converter is connected to an inner shaft concentric with the outer shaft. A clutching mechanism is interposed between the inner and outer shafts to drivingly connect the turbine rotor to either of the two shafts selectively.

The clutching mechanism is torque responsive and is effective, upon energization of the slow speed motor, to drivingly connect the slow speed output gear to the turbine rotor to initiate rotation from an "at rest" position to a slow speed and effective, upon engagement of the high speed motor, to disconnect the slow speed output gear and drivingly connect the high speed motor to the turbine rotor, thereby to accelerate the rotor from the slow speed to a speed at which combustion in the turbine is sufficient to render the turbine speed self-sustaining. As the turbine rotor becomes self-sustaining and increases in speed, the resulting reversal of torque on the clutching mechanism is effective to disconnect the high speed motor. Both motors may then be deenergized.

BRIEF DESCRIPTION OF THE DRAWINGS

FIGURE 1 is a side elevational view of a gas turbine power plant having a cranking system in accordance with the invention;

FIG. 3 is a fragmentary axial view of the clutching mechanism shown in FIG. 2, the clutching mechanism being shown in the slow speed driving position;

FIG. 4 is a view similar to FIG. 3 but with the clutching mechanism shown immediately after initiation of the high speed driving position;

FIG. 5 is a view similar to FIG. 4 but with the clutching mechanism shown in the position attained after acceleration to a considerably higher speed; and FIG. 6 is a view similar to FIG. 5 but with the clutching mechanism shown in the completely disengaged position.

DESCRIPTION OF THE PREFERRED EMBODIMENT

Figure 2:
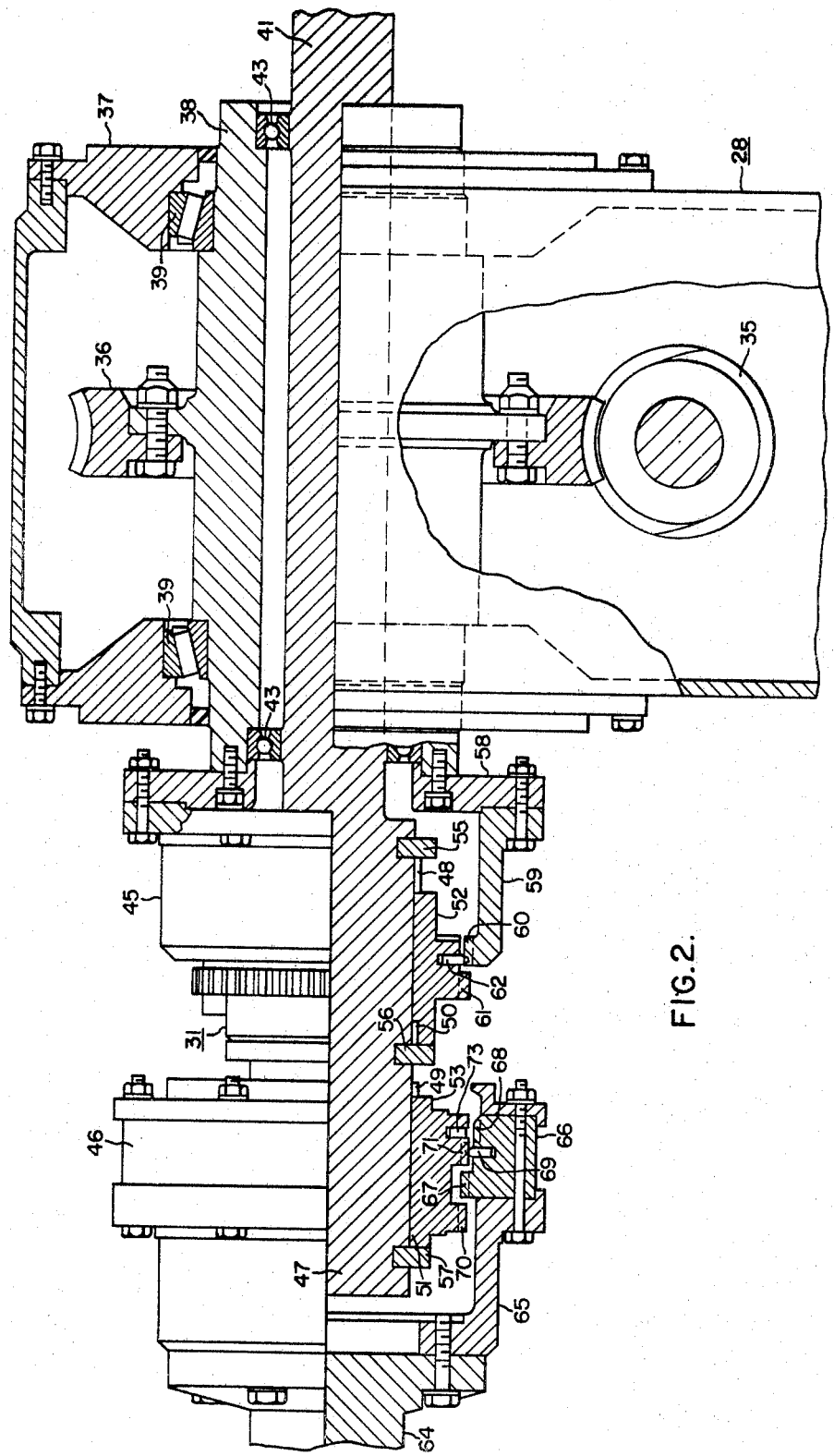
FIG. 2 is an enlarged view, partially in axial section and partially in elevation, of a portion of FIG. 1; the clutching mechanism being shown in the "at rest" position.

Referring to the drawings in detail, in FIG. 1 there is shown a typical gas turbine power plant 10 provided with a cranking system 12 incorporating the present invention.

The power plant 10, in the example shown, is an electrical power generating plant and includes a gas turbine 14, an electric power generator 15, and a small generator or exciter 16. The rotors of the turbine, generator and exciter are connected in tandem to each other by suitable couplings 17 to form a rotor aggregate and rotate as a unit. Accordingly, as well known in the art, the gas turbine 14 is the prime mover for the generator 15 and the exciter 16.

The gas turbine 14 may be of any suitable type, hence its internal structure is not fully shown. As well known in the art, the gas turbine is provided with the usual components including an air intake 18, an air compressor 19, a fuel combustion structure 20, a turbine 21 and an exhaust outlet 22. The gas turbine 14 is provided with a rotor structure 23 comprising a bladed turbine rotor portion 24 and a bladed compressor rotor portion 25 connected to each other by a connecting shaft portion 26.

In operation, air is drawn through the air intake 18 by the compressor 19 and delivered in a pressurized state to the combustion structure 20 to support the combustion of fuel admitted thereto in any suitable manner. The resulting hot gaseous products of combustion are thence expanded through the turbine portion 21 to motivate the rotor 23 and are finally exhausted to the atmosphere through the outlet 22. The rotating power thus produced is employed to drive the generator 15 and the exciter 16.

To initiate operation of the gas turbine 14, the turbine rotor 23 must be cranked by an external power supply to a moderately high speed before fuel combustion can be safely initiated in a manner to render the turbine capable of attaining a self-sustaining speed. In the embodiment shown, the turbine is directly connected to the generator 15 and the generator is of the two pole type with a power output of 60 cycles A.C. Hence the normal running speed of the turbine in this example is 3600 r.p.m.

In this example, the turbine rotor must be cranked to a predetermined speed of about 25% of normal speed or 900 r.p.m. and then fuel ignition is initiated so that the cranking effort is augmented by the motive gases produced until the turbine attains about 50% of rated speed, at which time it is self-sustaining and capable of acceleration to its rated speed without further cranking by the external power supply.

The above is well known in the art and is more fully shown and described in P. D. Evans Patent 2,962,597, issued Nov. 29, 1960, and assigned to the same assignee as the present invention.

In accordance with the present invention, the cranking system 12 comprises a slow output speed, high reduction gearmotor 28, a high speed motor (or prime mover) 30 and a clutching mechanism 31 disposed in coaxial alignment with each other and the rotational axis of the power plant 10.

The high speed motor 30 is of the internal combustion type having low torque at slow speed and, as illustrated, is a reciprocating engine of the diesel type having a hydraulic torque converter 32 for transmitting power from the crankshaft (not shown) of the diesel motor to the output shaft 33, and thence to the clutching structure through a coupling 34.

The slow speed motor 28, as best shown in FIG. 2, is of the electrical type having a high starting torque and having a high reduction gear comprising a worm gear member 35 in driving relation with an output ring gear member 36. The worm and ring gear 35, 36 is enclosed in suitable housing structure 37 rotatably supporting a hollow stub shaft 38 at opposite ends by roller bearings 39, and the ring gear 36 is bolted in encompassing driving relation with the hollow shaft 38.

An inner shaft 41, disposed in concentric relation with the hollow shaft 38 and rotatably supported therein by suitable ball bearings 43, is attached at one end by the coupling 34 to the diesel output shaft 33. Accordingly, it will be noted that the inner and outer shafts 41 and 38 are coaxial but independently rotatable.

The clutching mechanism 31 comprises a first clutch structure 45, hereinafter termed the "turning gear clutch" and a second clutch structure 46, hereinafter termed the "starting clutch."

The inner shaft 41 has an end portion 47 extending into the clutches 45 and 46 and forming a portion thereof. The end portion 47 is provided with two annular sets of external helical splines 48 and 49 with which engage internal helical splines 50 and 51 in intermediate sleeve members 52 and 53. The sleeve member 52 is capable of limited helical movement relative to the shaft portion 47 between annular stops 55 and 56 and, in a similar manner, the sleeve member 53 is capable of limited helical movement between the annular stop 56 and an annular stop 57.

The outer shaft 38 is bolted to a radially outwardly projecting flange 58 which, in turn, is bolted to a cylindrical outer clutch member 59 encompassing the intermediate sleeve 52 and having an annular array of internal teeth 60.

The intermediate sleeve 52 is provided with an annular array of external teeth 61 engageably associated with the internal teeth 60 and maintained in axial alignment therewith during initial engagement by an annular array of primary pawls 62 carried by the intermediate sleeve 52.

The shaft 64 of the exciter 16 is bolted to a cylindrical member 65 encompassing the intermediate sleeve 53 and bolted, in turn, to an outer clutch ring 66 having two annular arrays of internal teeth 67 and 68 and an annular array of primary pawls 69 disposed in axially spaced relation with each other.

The intermediate sleeve 53 is provided with two annular arrays of external teeth 70 and 71 engageably associated with the internal teeth 67 and the pawls 69, respectively, and an annular array of secondary pawls 73 engageably associated with the internal teeth 68. Accordingly, the teeth 67 and 70 are driving teeth, while the teeth 68 and 71 are ratcheting teeth.

In FIG. 2, the clutching mechanism 31 (comprising the turning gear clutch 45 and the starting clutch 46) is shown in the "at rest" position. It will be noted that in this position the two intermediate sleeves 52 and 53 are disposed in their extreme left positions and in abutment with their respective stops 56 and 57.

The pawls 62, 73 and 69 are of the well known speed responsive, centrifugally actuated type and are so weighted that, in the "at rest" position, the pawls 62 are in the extended position and in engagement with the teeth 60, thereby to maintain the teeth 60 and 61 in engageable alignment with each other; the pawls 69 are in the extended position and in engagement with the teeth 71, thereby to maintain the teeth 67 and 70 in engageable alignment with each other; and the pawls 73 are in the retracted position and out of engagement with the teeth 68.

By way of example, in an application wherein the slow speed or turning gear output shaft 38 has a turning speed of 15 r.p.m. or less; the gas turbine 14 has a normal running speed of 3600 r.p.m.; and the high speed or torque converter output shaft 33 has a "no load idle" speed of about 1200 r.p.m. (assuming no slippage in the converter 33), a "load idle" speed of about 700 r.p.m. (assuming about 500 r.p.m. slippage in the converter), and a top speed under load of about 1800 r.p.m. (assuming about 300 r.p.m. slippage in the converter) the primary pawls 62 and 69 and the secondary pawls 73 are so weighted that they operate as follows:

*Below 200 r.p.m.*—Primary pawls 62 and 69 are extended but out of registry with their respective teeth 60 and 71.

*Above 200 r.p.m.*—Primary pawls are retracted and out of engagement with their respective teeth.

*Below 160 r.p.m.*—Secondary pawls 73 are retracted and out of engagement with the ratcheting teeth 68.

*Above 160 r.p.m.*—Secondary pawls 73 are extended and in teeth engaging position.

However, if the teeth 68 are turning faster (in the same direction) than the pawls 73, the pawls will ratchet.

From the above, it will be noted that the action of the pawls overlap, i.e., from 160 r.p.m. to 200 r.p.m. all pawls are extended.

To initiate the cranking of the gas turbine 14 from rest, the slow speed motor 28 is energized by any suitable means (not shown) and rotation of the hollow stub shaft 38 thus started. The outer clutch member 59 and the intermediate sleeve member 52 are thus rotated as a unit, since the primary pawls 62 are initially in engagement with the associated teeth 60. Accordingly, the sleeve member 52 is translated helically to the right, as shown in FIG. 3, along the splines 48 into abutment with the stop 55 and jointly therewith the driving teeth 60 and 61 are engaged. As the teeth 60 and 61 engage each other, the turning gear clutch 45 is engaged, with the outer coupling member 59 driving the sleeve member 52, and torque is transmitted to the internal shaft portion 47 causing the sleeve member 53 to translate helically to the right along the splines 49 into abutment with the stop 56, and concomitantly causing the driving teeth 67 and 71 to engage. As the teeth 67 and 71 are engaged, the starting clutch 46 is engaged with the sleeve member 53 driving the outer clutch ring 66, and torque is transmitted through the outer clutch ring 66, cylindrical member 65 and the exciter shaft 64, thereby initiating slow speed (about 15 r.p.m., in this example), rotation of the entire tandem shaft aggregate including the exciter 16, the generator 15 and the gas turbine rotor 23.

Together with the shaft end portion 47, the inner shaft 41 is rotated freely without the drag of the diesel 30, such free rotation being readily accommodated by inherent slippage in the hydraulic converter 32.

The diesel engine 20 is then started. Due to the high slippage in the converter 32, especially at very low speed, the engine 30 may be accelerated and, as it assumes driving effort on the inner shaft 41, the turning gear motor 28 becomes unloaded and the reversal of torque is sensed by the inner sleeve member 52. As the speed of the inner shaft 41 passes through synchronous speed relative to the speed of the outer shaft 38 (15 r.p.m.), the sleeve member 52 is translated helically to the left into abutment with the stop 56, as shown in FIG. 4, thereby disengaging the driving teeth 60 and 61. Hence the turning gear clutch 45 and the turning gear motor 28 are disengaged.

The torque direction on the intermediate sleeve 53 is unchanged, however, and is still directed from the inner shaft portion 47 to the outer clutch 67. Accordingly, the turbine rotor 23 is now driven by the diesel engine 30 through the inner shaft 41 and the driving clutch 46, and the turning gear motor 28 may be deenergized, if desired.

In FIG. 4, the primary and secondary pawls 62, 69 and 73 are illustrated in the positions corresponding to a speed of below 160 r.p.m., but above turning gear speed, as explained previously. It will be noted that in this position, the primary pawls 62 on the sleeve 52 are disposed in ratcheting engagement with the associated teeth 60 in the outer clutch member 59 which is now at rest, since the motor 28 is deenergized.

As the speed of the high speed motor output shaft 41 passes through a speed of 200 r.p.m., the pawls assume the positions shown in FIG. 5, i.e. the primary pawls 62 and 69 are retracted, while the secondary pawls 73 are shown in the extended position that they assumed as the speed of the high speed motor passed through 160 r.p.m. This position of the sleeve 53 is maintained as long as the diesel engine 30 provides torque to drive the turbine rotor 23, and terminates when the turbine rotor attains a speed at which it is self-sustaining. In the example given, the normal running speed of the turbine is 3600 r.p.m. Hence, after the turbine rotor speed is brought up to about 25% of running speed, i.e. 900 r.p.m., by the diesel engine, fuel ignition may be initiated in the fuel combustion structure 29, as well known in the art. The cranking effort of the diesel engine 30 is thus augmented by the motive effect of the combustion gases produced to continue the acceleration of the turbine to about 50% of normal running speed, i.e. about 1800 r.p.m.

As the turbine attains 50% of running speed, it becomes self-sustaining and exceeds the speed of the torque converter shaft 33, with an attendant reversal in torque across the starting clutch 46. As the self-sustained speed of the rotor aggregate, including the exciter shaft 64 (FIG. 2) rises above synchronous speed relative to the speed of the inner shaft portion 47, the torque reversal is effective to cause the sleeve 53 of the clutch 46 to translate helically to the left, as shown in FIG. 6, into abutment with the stop 57. During such movement, the driving teeth 71 and 67 are translated out of engagement with each other, thereby disengaging the clutch 46. Subsequent thereto, the diesel engine may be shut down, if desired, and as the speed of the inner shaft 41 falls below 160 r.p.m. the secondary pawls 73 are retracted.

Thereafter the turbine 14 may be self-accelerated to its normal running speed of 3600 r.p.m. to assume the generator load, with both clutches 45 and 46 completely disengaged, both the turning gear motor 28 and diesel engine 30 shut down, and the inner and outer shafts 38 and 41, respectively, come to rest.

When the power plant is subsequently to be shut down after a running period (for maintenance or because electrical power is no longer required), as well known in the art, it is necessary that the rotor aggregate, previously described (most particularly the turbine rotor 23) be allowed to cool in a uniform manner to avoid thermal bowing along the length of the rotor which would occur if cooling occurred non-uniformly. This uniform cooling process is provided as illustrated in example hereinafter set forth.

After load has been relived from the generator 15, fuel to the gas turbine is shut off, combustion ceases, and the rotor aggregate speed begins to slow down in response to friction and windage drag forces. When this speed has reduced to approximately 20% of the normal running speed, i.e. 720 r.p.m., the slow speed motor 28 is re-energized, causing the shaft 38 to start to rotate. As previously described, this rotation causes the "turning gear" clutch 45 to come into engagement and thereby cause the shaft 47 to attain a rotation speed of approximately 15 r.p.m. Concurrently, however, the rotation speed of the exciter shaft 64 and "starting clutch" members 65 and 66, is still much higher than that of the shaft 47, hence the "starting clutch" remains in a disengaged position. As the rotative speed of the exciter shaft and connected "starting clutch" members drops below 200 r.p.m., the primary pawls 69 become centrifugally unloaded and commence to ratchet on the teeth 71. As soon as the speed of the "starting clutch" member 66 becomes very slightly less than synchronous with the slow speed rotation of shaft 47, the pawls 69 cease to ratchet and cause the torque transmitting teeth 67 and 70 to come into alignment. The slight differential speed thus established between the sleeve 53 and shaft 47 causes the sleeve to be displaced axially along the helical splines 49 until it abuts the stop 56 and simultaneously engages the teeth 67 and 70. With the attainment of this position, the "starting clutch" 46 is engaged and thus transmits the torque originating at the motor 28 to maintain slow speed rotation of the rotor aggregate. This slow speed rotation is continued for the duration of the cooling period with no distress to the starting motor 30, which has not been re-started, due to slippage within the torque converter. At the termination of the cooldown period, the motor 28 is deenergized and comes to rest. The inertia of the rotating shaft 47 assisted by friction in the "starting clutch" 46 causes the "turning gear" clutch to become disengaged. Similarly, the inertia of the rotor aggregate assisted by friction in the torque converter 32 causes the "starting clutch" to become disengaged. In the final "at rest" condition, the entire clutching mechanism 31 is disengaged and the components of the clutch mechanisms 45 and 46 are returned to their initial "at rest" position, as shown in FIG. 2, in readiness for another cranking cycle, as hereinbefore described.

Although, in the above method of operation of the novel cranking system, it has been indicated that the slow speed motor 28 may be deenergized after cranking power in the higher speed range is assumed by the high speed motor 30, it may be maintained in the energized state as long as desired without deleterious effects. Hence, if for any reason, the high speed motor 30 should stall or otherwise abort the cranking sequence, as the speed of the exciter shaft 64 falls and passes through synchronous speed of the outer shaft 38 (15 r.p.m. in the example) the clutch components will sense the reversal of thrust and return to the positions shown in FIG. 3, thereby to re-initiate slow speed rotation of the rotor aggregate until the high speed motor 30 may be re-started to again provide the accelerating torque to self-sustaining of the turbine rotor 23.

Also, although it has been indicated that the high speed motor 30 may be deenergized after the turbine speed becomes self-sustaining, the high speed motor may be maintained in energized position but throttled back to a suitable "no load" idle speed and in readiness to re-assume cranking in the event of a temporary mal-function in the turbine causing a de-acceleration of the turbine rotor below the self-sustaining speed. As the falling turbine speed becomes synchronous with the idle speed of the torque converter shaft 33, the components of the clutch 46 will re-assume the positions shown in FIG. 5 to place the high speed motor in cranking relation with the rotor aggregate by way of the clutch mechanism 46.

It will now be seen that the invention provides a cranking system for a gas turbine which system employs a slow speed high starting torque motor, a high speed low starting torque motor arranged in axially spaced driving relation with each other and first and second clutch mechanisms arranged to transmit starting torque from the low speed motor to the turbine rotor and accelerating torque from the high speed motor to the turbine rotor after the massive starting inertia of the turbine rotor is overcome by the low speed motor.

It will also be seen that the invention provides a novel torque sensitive clutch mechanism permitting power from two motors to be transmitted selectively therethrough from one or the other of two coaxial driving shafts (such as the inner and outer shafts 41 and 38) to a single driven shaft (such as the shaft 64), without requiring the turning of both motors.

It will further be noted that the invention provides a novel coaxial arrangement of the above type that permits employment of a motor having a low starting torque (such as an internal combustion motor or other prime mover) and utilizing a converter to provide slippage in the low speed range. Such motors are considerably less expensive in high horsepower ratings than comparable high starting torque motors (such as electric motors).

While the invention has been shown in one form, it will be obvious to those skilled in the art that it is not so limited, but is susceptible of various other changes and modifications without departing from the spirit thereof.

I claim as my invention:
1. A system for cranking a gas turbine from a state-of-rest to a self-sustaining speed, comprising
    a gas turbine having a rotor,
    a first prime mover having a slow speed output gear,
    a second prime mover having an output shaft rotatable in a speed range extending from at least as slow as said output gear to at least as high as the self-sustaining speed of said gas turbine,
    a fluid, slip type torque converter connected to said output shaft,
    means connecting said turbine rotor, said output gear, and said torque converter in axial alignment with each other,
    torque responsive clutching means interposed in said connecting means between said slow speed output gear and said turbine rotor,
    said clutching means being initially engageable by the torque of said first prime mover and effective to drivingly connect the output gear of said first prime mover to said rotor to initiate rotation of said rotor from an at rest position to said slow speed, and engageable by the torque of said second prime mover and effective to disconnect the output gear of said first prime mover and drivingly connect said second prime mover to accelerate said rotor from said slow speed to said self-sustaining speed, and subsequently disengageable by a reversal in torque and effective to disconnect said second prime mover when said rotor attains a running speed greater than that of said second prime mover.

2. The system recited in claim 1, wherein
    the connecting means includes an inner shaft and an outer shaft concentric therewith,
    said inner shaft being connected to the output shaft, and
    said outer shaft being connected to the slow speed output gear.

3. The system recited in claim 1, wherein
    the clutching means includes first and second clutch mechanisms,
    said first clutch mechanism having a first driving member connected to the slow speed output gear and a first driven member,
    said second clutch mechanism having a second driving member connected to said first driving member and a second driven member connected to the turbine rotor.

4. The system recited in claim 3, wherein
    the first clutch mechanism is engageable in response to torque transmitted from said first driving member to said first driven member, and
    the second clutch mechanism is engageable in response to torque transmitted from said second driving member to said second driven member,
    whereby, when the first prime mover is energized, said first and second clutch mechanisms are engaged and are effective to transmit power at slow speed from the first prime mover to the turbine rotor to initiate slow rotation of the latter.

5. The system recited in claim 2, wherein
the clutching means includes first and second clutch mechanisms,
said first clutch mechanism having a first drivable member connected to the outer shaft and a second drivable member connected to the inner shaft,
said second clutch member having a third drivable member connected to the inner shaft and a fourth drivable member connected to the turbine rotor,
the first clutch mechanism being disengageable in response to torque transmitted from said second drivable member to said first drivable member, thereby to disengage the first prime mover,
the second clutch mechanism being engageable in response to torque transmitted from said third drivable member to said fourth drivable member,
whereby the second prime mover is energized, said first clutch mechanism is disengaged and said second clutch is engaged and is effective to transmit power from the second prime mover to the turbine rotor to accelerate rotation of the latter to the self-sustaining speed.

6. The structure recited in claim 1, wherein the first prime mover has a high torque at slow speed and the second prime mover has a low torque at slow speed.

7. The structure recited in claim 6, wherein the second prime mover is a reciprocating internal combustion engine.

8. The structure recited in claim 1, wherein said first prime mover has a high starting torque, the second prime mover has a low starting torque, and the torque converter provides slippage between the output shaft and the second prime mover during starting and slow speed running thereof.

9. The structure recited in claim 8, wherein the first prime mover is an electrical motor and the second prime mover is an internal combustion motor.

10. A system for cranking a gas turbine from a state-of-rest to a self-sustaining speed, comprising
a gas turbine having a rotor,
a first prime mover having a slow speed output gear,
a second prime mover having an output shaft rotatable in a speed range extending from at least as slow as said output gear to at least as high as the self-sustaining speed of said gas turbine,
a fluid, slip type torque converter connected to said output shaft,
means including an inner and an outer concentric shaft connecting said turbine rotor, said output gear, and said torque converter in axial alignment with each other,
one of said concentric shafts being connected to said output shaft, and the other of said concentric shafts being connected to said slow speed output gear,
torque responsive clutching means associated with said inner and outer shafts and interposed between said slow speed output gear and said turbine rotor,
said clutching means being effective to drivingly connect the output gear of said first prime mover to said rotor in response to torque from said first prime move to initiate rotation of said rotor from an at rest position to said slow speed, and effective to disconnect the output gear of said first prime mover and drivingly connect said second prime mover to said rotor in response to torque from said second prime mover to accelerate said rotor from said slow speed to said self-sustaining speed, and further effective to disconnect said second prime mover in response to a reversal in torque when said rotor attains a running speed greater than that of said second prime mover.

References Cited

UNITED STATES PATENTS 2,962,597  11/1960  Evans _____ 60—39.14 XR
3,251,442  5/1966  Aschauser ____ 192—48.92 XR CARLTON R. CROYLE, Primary Examiner A. D. HERRMANN, Assistant Examiner U.S. Cl. X.R.
192—48.6, 48.8, 104